US009280903B2

(12) United States Patent
Judy et al.

(10) Patent No.: US 9,280,903 B2
(45) Date of Patent: Mar. 8, 2016

(54) IN-AIRCRAFT FLIGHT PLANNING WITH DATALINK INTEGRATION

(71) Applicant: Honeywell International Inc., Morristown, NJ (US)

(72) Inventors: Victoria Judy, Cave Creek, AZ (US); David Pepitone, Sun City West, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 37 days.

(21) Appl. No.: 14/156,164

(22) Filed: Jan. 15, 2014

(65) Prior Publication Data

US 2015/0199906 A1 Jul. 16, 2015

(51) Int. Cl.
*G01C 23/00* (2006.01)
*G08G 5/00* (2006.01)

(52) U.S. Cl.
CPC .............. *G08G 5/003* (2013.01); *G08G 5/0013* (2013.01); *G08G 5/0021* (2013.01); *G08G 5/0039* (2013.01)

(58) Field of Classification Search
USPC .................................................. 701/400–550
See application file for complete search history.

(56) References Cited

U.S. PATENT DOCUMENTS 8,164,485 B2 4/2012 Prinzel, III et al.
8,164,487 B1* 4/2012 Tsai ....................... G01C 23/00 340/574
8,352,102 B2 1/2013 Deker et al.
2005/0049762 A1* 3/2005 Dwyer ................. G08G 5/0021 701/3
2008/0195309 A1* 8/2008 Prinzel, III ............. G01C 23/00 701/532
2011/0246053 A1* 10/2011 Coulmeau ............ G08G 5/0039 701/120
2012/0095623 A1 4/2012 Barral et al.
2013/0085661 A1* 4/2013 Chan ...................... G05D 1/104 701/122
2014/0003335 A1* 1/2014 Roy ........................ H04L 69/14 370/328
2014/0336915 A1* 11/2014 Pakki ................... G08G 5/0013 701/120

FOREIGN PATENT DOCUMENTS

EP 2159544 3/2010
WO 0231796 4/2002
WO 2005038748 4/2005

OTHER PUBLICATIONS

Woodrow Bellamy III, "TCPDLC: Transitioning to Computer Pilot Data Link Communications", Dec. 1, 2014, Aviation Magazine: http://www.aviationtoday.com/av/issue/feature/TCPDLC-Transitioning-to-Controller-Pilot-Data-Link-Communications_83743.html.*

(Continued)

*Primary Examiner* — Rami Khatib
*Assistant Examiner* — Timothy Nesley
(74) *Attorney, Agent, or Firm* — Fogg & Powers LLC

(57) ABSTRACT

In one embodiment an in-aircraft system that implements a flight planning module is provided. The flight planning module is configured to display on the display unit a pending flight plan and implement a first button associated with a display of the pending flight plan. The first button, if selected, directs the one or more processing units to convert the pending flight plan to a format for sending in a datalink message, and to cause the pending flight plan to be sent to a ground station in a downlink datalink message without human input to a message applications module, the message applications module including instructions to display information corresponding to datalink messages on a display unit and to maintain a message log of datalink messages.

20 Claims, 3 Drawing Sheets

(56) References Cited

OTHER PUBLICATIONS

Young et al., “Real-Time Trajectory Planning for RNP Flight Operations”, May 13-15, 2009, pp. 1-9.

European Patent Office, “Extended European Search Report from EP Application No. 15150545.0 mailed Jun. 24, 2015”, “from Foreign Counterpart of U.S. Appl. No. 14/156,164”, Jun. 24, 2015, pp. 1-9, Published in: EP.

* cited by examiner

IN-AIRCRAFT FLIGHT PLANNING WITH DATALINK INTEGRATION

BACKGROUND

Aircraft pilots can create flight plans or flight plan modifications in the cockpit of the aircraft and send a downlink request for such flight plans or modifications to an air traffic control (ATC) ground station for approval. The pilots can also receive flight plan modification requests from an ATC ground station. Such activity can occur prior to take-off or during flight.

SUMMARY

In one embodiment an in-aircraft system is provided. The in-aircraft systems include one or more processing units coupled to a display unit and one or more data storage mediums coupled to the one or more processing units, the one or more data storage mediums including instructions which, when executed by the one or more processing units, cause the one or more processing units to implement a flight planning module. The flight planning module is configured to display on the display unit a pending flight plan and implement a first button associated with a display of the pending flight plan. The first button, if selected, directs the one or more processing units to convert the pending flight plan to a format for sending in a datalink message, and to cause the pending flight plan to be sent to a ground station in a downlink datalink message without human input to a message applications module, the message applications module including instructions to display information corresponding to datalink messages on a display unit and to maintain a message log of datalink messages.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

Currently, an aircraft pilot has to go to multiple displays to downlink route modifications to an ATC ground station. For example, the pilot can create and preview a route modification using pending flight plan capabilities on a flight management window, however, the pilot must then go to a separate page, an ATC downlink request page, to create and send the downlink ATC route modification request. All this activity requires multiple pilot actions, multiple dialogue boxes, etc.

Figure 1:
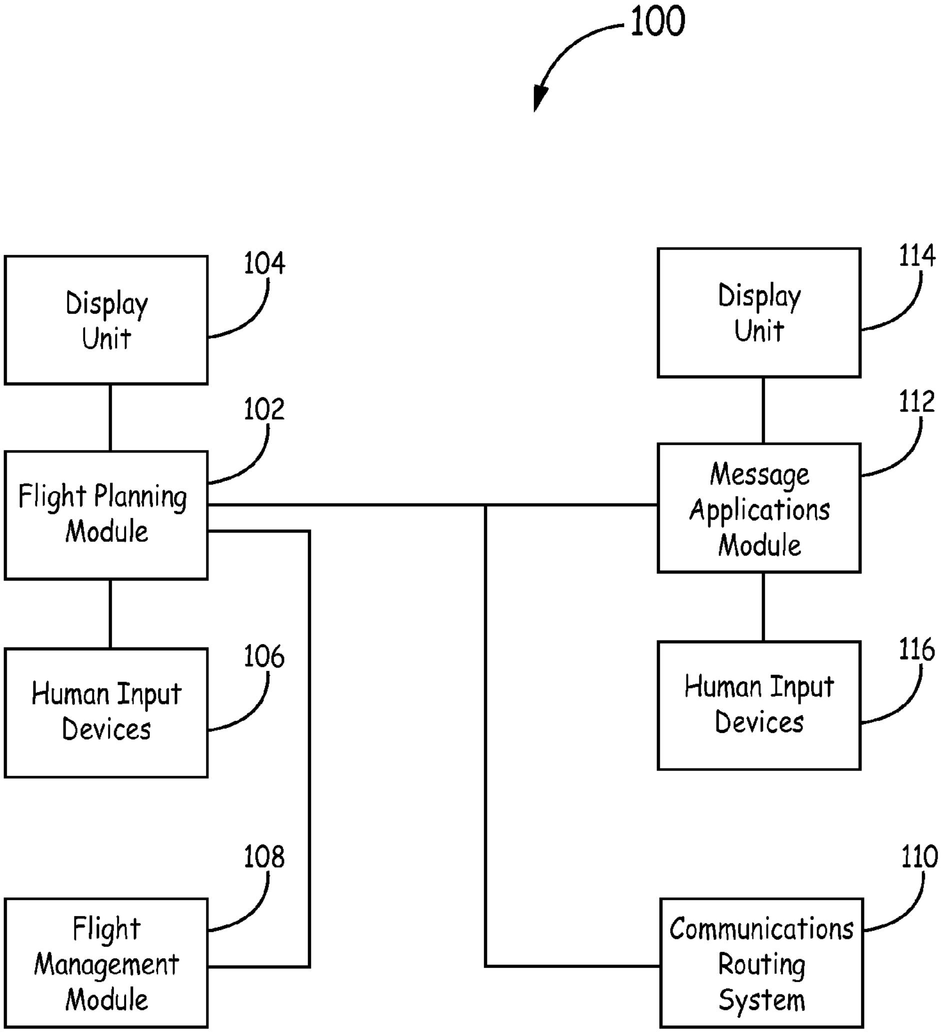
FIG. 1 is a block diagram of an example system for in-aircraft flight planning with datalink integration.

FIG. 1 is a block diagram of an example system 100 in an aircraft for in-aircraft flight planning with flight management and datalink integration. The system 100 includes a flight planning module 102 for implementing in-aircraft flight planning functions. The flight planning module 102 comprises processor-readable instructions that are configured to implement the flight planning functions when executed by one or more processing units. The flight planning module 102 can implement flight planning functions such as receiving input corresponding to a pending flight plan from a human (e.g., a pilot), displaying on a display unit one or more screens corresponding to the pending flight plan, receiving input corresponding to a change in the pending flight plan, and other functions. A pending flight plan is a flight plan that is not the active flight plan to the aircraft, for example, a potential new flight plan and/or a potential change to the active flight plan that is being planned by a pilot.

Figure 2:
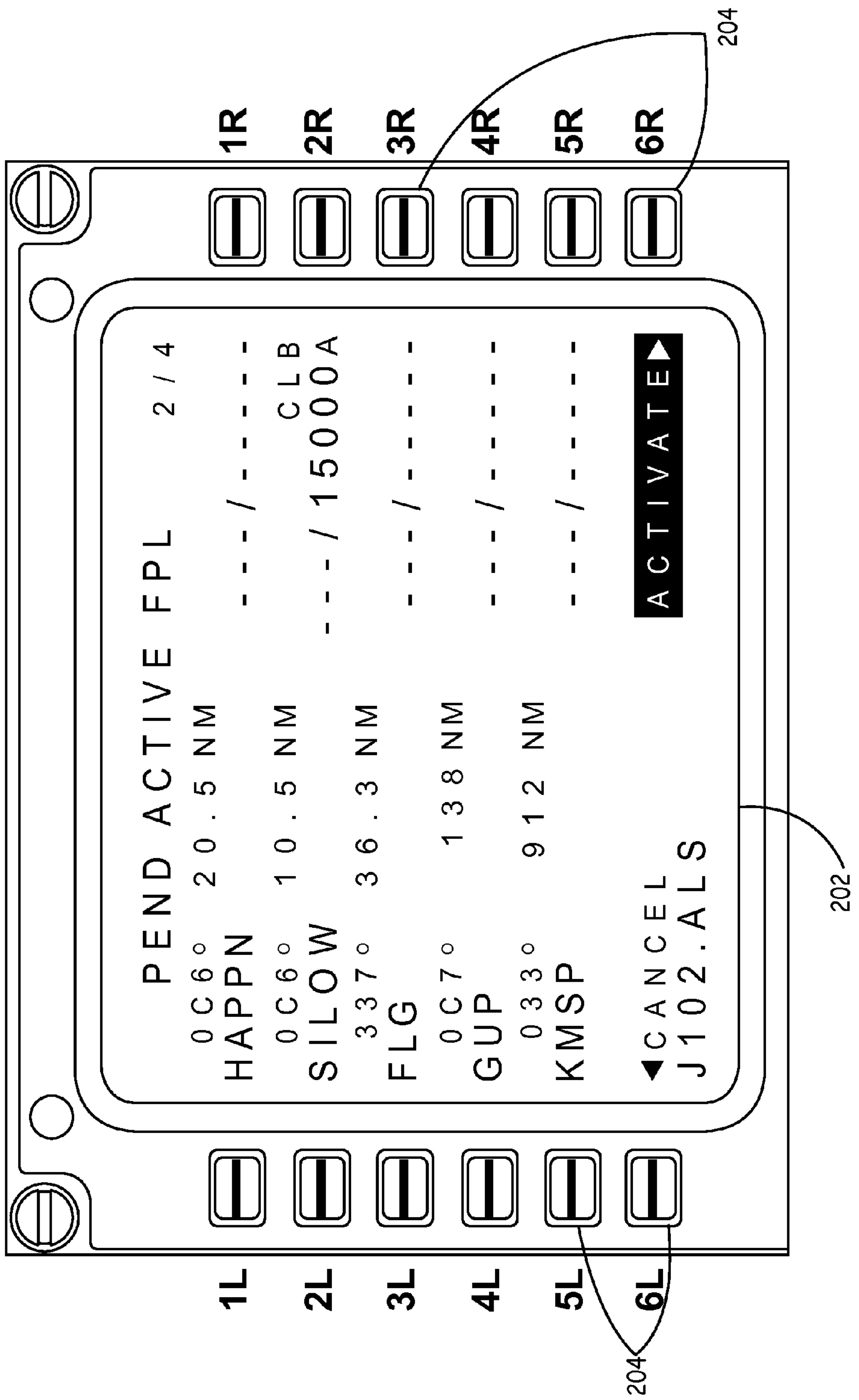
FIG. 2 is an example display unit of the system of FIG. 1.

As mentioned above, the flight planning module 102 comprises instructions that are stored on one or more data storage mediums. These one or more data storage mediums are coupled to one or more processing units which can execute the instructions to implement the functions of the flight planning module 102. The one or more processing units can include a general purpose processor, such as a central processing unit (CPU), or a special purpose processor. The one or more data storage mediums can include any suitable non-volatile technology such as flash memory, an optical disk, or a magnetic disk drive. A volatile memory that is coupled to the one or more data storage mediums and the one or more processing units can also be included for storing instructions (and related data) during execution by the one or more processing units. Memory comprises, in one implementation, any suitable form of random access memory (RAM) now known or later developed, such as dynamic random access memory (DRAM). In other implementations other types of memory are used. These one or more processing units are coupled to a display unit 104 upon which the flight planning module 102 can display items. For example, the flight planning module 102 can display a list of waypoints corresponding to a flight plan, such as shown in FIG. 2. In some examples, the flight planning module 102 can display a graphical illustration of a flight plan on a map.

The display unit 104 is disposed in a cockpit of an aircraft. In particular, the display unit 104 is disposed such that it is visible to one or both pilots in the aircraft. The display unit 104 includes a screen that is capable of displaying an image, such as by illuminating various pixels on the screen a certain color. The display unit 104 is also able to update the image, such that the image can change over time.

The one or more processing units are also coupled to one or more human input devices 106. The one or more human input devices 106 are configured to capture an input from a human, such as a pilot, in the aircraft. The input devices 106 are associated with the display unit 104. That is, the input devices 106 are configured such that inputs captured by the input devices 106 are coordinated with the image currently on the display unit 104. For example, the input devices 106 can include a touch screen that is integrated into the display unit 104, such that a human can touch a screen of the display unit 104 and the input device (touch screen) 106 captures that input. In an example, the input devices 106 include a keyboard and pointer device (e.g., mouse) that are coordinated with the display unit 104 such that inputs captured by the keyboard and pointer device directly cause changes in the image currently on the display unit 104. As known, a cockpit environment includes many input devices, and often includes multiple display units; however, just because the input devices are in the cockpit with a given display unit does not mean that the input devices are associated with that display unit as described herein. If an input device installed in a cockpit is not configured such that the inputs captured by that input device are coordinated to the image currently on the display unit, that input device is not considered to be associated with the display unit as used herein.

An example of coordination of an input device 106 with a display unit 104 includes that the effect caused by an input captured by the input device 106 is based on the image currently on the display device 104. One implementation of this example is evident in a touch screen. In a touch screen, the effect of capturing a "touch" at a given point on the screen is based on the image currently on the screen. If the image is displaying a button at the point in which the "touch" is located, the effect of capturing the touch is selection of the button. If the image is displaying a map at the point in which the "touch" is capture, the effect of capturing the touch may be to place a mark (e.g. waypoint) on the map at that point. Another example of coordination of an input device 106 with a display unit 104 includes a pointer device in which inputs captured by the pointer device cause movement of the pointer in the image currently on the display unit 104. In such an example, "clicking" of the pointer device causes a selection or other action to be taken based on what is "behind" the pointer on the image currently on the display unit 104. Another example of coordination of an input device 106 with a display unit 104 is a keyboard where typing on the keyboard causes characters to be displayed in the image or a cursor to move around the image. Another example of coordination of an input device 106 with a display unit 104 that is common in avionic display units is physical buttons disposed on the side of the screen of the display unit, such as is shown in FIG. 2. The display unit 104 in FIG. 2 includes a screen 202 having a column of physical buttons 204 on either lateral side of the screen 202. Such physical buttons 204 can be coordinated with a portion of the image immediately adjacent the respective button 204, such that the activation of a given physical button 204 causes selection of a virtual button in the image on the display adjacent the physical button 204. An example input device 106 includes a pointing device (e.g., mouse), keyboard, touchscreen, physical button as discussed above. Other example input devices 106 include a microphone, joystick, camera, and touchpad. Other input devices may also be used.

An example of an input device that is not coordinated with the display unit 104 includes a microphone that captures audio in the cockpit for archival purposes (e.g., a "black box"), and has no effect on the image on the display unit 104. Another example of an input device that is not coordinated with the display unit 104 includes a button on a second display unit that is coordinated with that second display unit, but the effect caused by an input captured by that input device is not based on the image on the display device 104.

In addition to the flight planning module 102, the in-aircraft system 100 also includes a flight management module 108. The flight management module 108 implements the active flight plan for the aircraft. That is, the flight management module 108 receives inputs from navigation sensors (e.g., global navigation satellite system, inertial navigation system) and controls flight of the aircraft based thereon to guide the aircraft along the active flight plan. The flight management module comprises processor-readable instructions that are configured to implement the flight planning functions when executed by one or more processing units. The instructions are stored on one or more data storage mediums which are coupled to one or more processing units. The one or more data storage mediums and one or more processing units can be the same one or more data storage mediums and/or one or more processing units as described above with respect to the flight planning module 102 or can be a different one or more data storage mediums and/or one or more processing units.

The in-aircraft system 100 also includes a communications routing system 110. The communications routing system 110 comprises routers and transceivers to transmit and receive signals between the aircraft and one or more ground stations over one or more avionic datalinks. The communications routing system 110 can include a datalink router and one or more datalink radios. Example datalink radios include a very high frequency (VHF) radio, ultra high frequency (UHF) radio, and a satellite communication (SAT-COM) radio.

The in-aircraft system 100 also includes one or more message applications modules 112. Each message applications module 110 implements datalink messaging for of one or more classes of datalink messages. A class of datalink messages as used herein is a type of datalink message that can be distinguished from other types of datalink messages by the communications routing system 110. Since the communications routing system 110 does not fully decode messages, the communications routing system 110 can determines a destination for a given message based on overhead information within the messages. Different classes of messages have different overhead information such that the communications routing system 110 can distinguish between the different classes and, potentially, route the different classes to a different entity. In some examples, multiple classes of datalink messages are routed to the same entity even though other classes of datalink messages are routed to different entities. Example classes of datalink messages include controller pilot datalink communications (CPDLC) messages, ARINC 702 messages, ARINC 623 messages, maintenance messages, passenger services messages, weather data messages, and operations messages other than ARINC 702 messages. Other classes of datalink messages can also be acted on by the system 100.

To implement datalink messaging the message applications module 110 can receive input from a human (e.g., a pilot) to generate a downlink datalink message and can displaying on a display unit one or more screens for a human to view an uplink datalink message. The message applications module 112 can communicate with the communications routing system 110 to send the downlink datalink messages generated and to receive the uplink datalink messages displayed. The message applications module 112 also maintains one or more message logs that keeps track of all uplink and downlink datalink messages to and from the aircraft within the one or more classes of datalink messages corresponding to the message applications module 102. Accordingly, a first message applications module can maintain a first log that stores information on all datalink messages of a first class (e.g., CPDLC), and a second message applications module can maintain a second log that stores information on all datalink messages of a second class (e.g., ARINC 702). If a given message applications module implements (corresponds to) datalink messaging for multiple classes of datalink messages, that message applications module maintains one or more logs for all of the multiple classes of datalink messages.

Similar to the flight planning module 102, the message applications module 112 comprises processor-readable instructions that are configured to implement the datalink messaging described above and elsewhere herein when the instructions are executed by one or more processing units. The instructions are stored on one or more data storage mediums which are coupled to one or more processing units. The one or more data storage mediums and one or more processing units can be the same one or more data storage mediums and/or one or more processing units as described above with respect to the flight planning module 102 or flight management module 108 or can be a different one or more data storage mediums and/or one or more processing units.

The one or more processing units that execute the instructions of the message applications module 112 are coupled to a display unit 114 and one or more human input devices 116. In an example, the display unit 114 and the one or more human input devices 116 are the same display unit 104 and one or more human input devices 106 that interact with the flight planning module 102. In other examples, the display unit 114 and the one or more human input devices 116 are distinct from the display unit 104 and the one or more human input devices 106 that interact with the flight planning module 102. In examples where the display unit 114 and the one or more human input devices 116 are distinct from the display unit 104 and the one or more human input devices 106, the display unit 114 and the one or more human input devices 116 can comprise a second display unit 114 and second one or more human input devices 116 associated with that display unit 114 in the cockpit of the aircraft.

The display unit 114 is disposed such that it is visible to one or both pilots in the aircraft. The display unit 114 includes a screen that is capable of displaying an image, such as by illuminating various pixels on the screen a certain color. The display unit 114 is also able to update the image, such that the image can change over time. The one or more human input devices 116 are configured to capture an input from a human, such as a pilot, in the aircraft. The input devices 116 are associated with the display unit 114. That is, the input devices 116 are configured such that inputs captured by the input devices 116 are coordinated with the image currently on the display unit 114. For example, the input devices 116 can include a touch screen that is integrated into the display unit 114, such that a human can touch a screen of the display unit 114 and the input device (touch screen) 116 captures that input. In an example, the input devices 116 include a keyboard and pointer device (e.g., mouse) that are coordinated with the display unit 114 such that inputs captured by the keyboard and pointer device directly cause changes in the image currently on the display unit 114.

Figure 3:
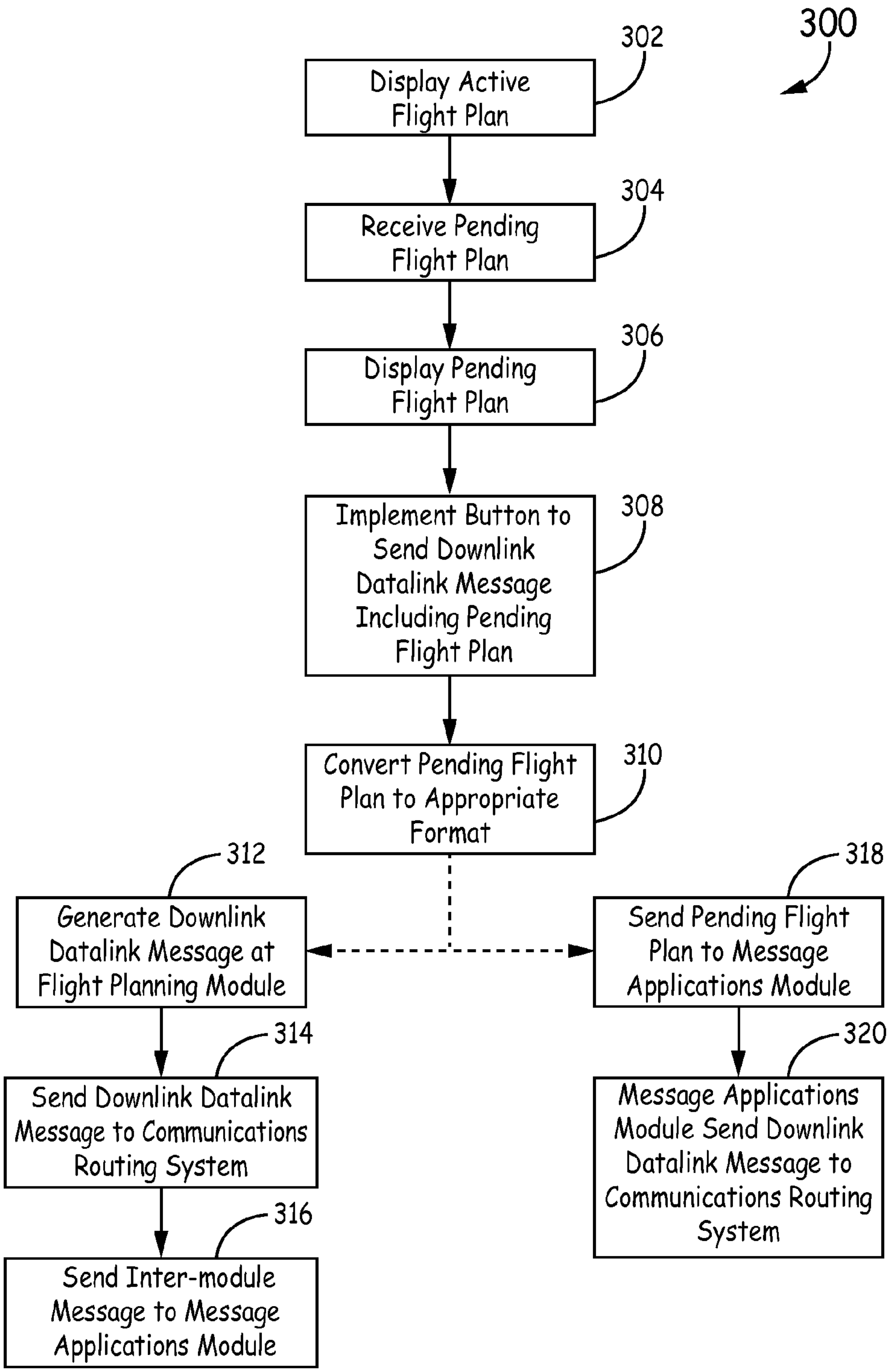
FIG. 3 is a flow diagram of an example method for in-aircraft flight planning using the system of FIG. 1.

FIG. 3 is a flow-diagram of an example method 300 for in-aircraft flight planning using the system 100. To provide the pilots with information regarding the active flight plan (i.e., the flight plan in which the pilots and flight management module 108 are currently controlling the aircraft in accordance with), the flight planning module 102 can cause images on the display unit 104 to be displayed corresponding to the active flight plan (block 302). These images can include a graphical map illustration of the active flight plan or a portion thereof, a list of waypoints on the active flight plan, and/or other images. The active flight plan can be received based on inputs captured by the input devices(s) 106 from a pilot or the active flight plan can be received from the flight management module 108.

The flight planning module 102 can also be configured to receive signals from the input device(s) 106 during execution of the active flight plan, the signals indicating a route for a least a portion of a pending flight plan (block 304). For example, a pilot may wish to explore modifying the active flight plan and the flight planning module 102 is configured to enable the pilot to generate a different flight plan, referred to herein as a pending flight plan. As the flight planning module 102 obtain the inputs corresponding to the route for the pending flight plan, the flight planning module 102 causes the pending flight plan to be displayed on the display unit 104 (block 306). The pending flight plan can be displayed on the display unit 104 in any suitable form including as an overlay or additional marking on the active flight plan, or in a separate portion of the screen from the active flight plan, or the active flight plan can be cleared from the screen of the display unit 104 and the pending flight plan can be displayed instead. In any case, the flight planning module 102 can cause the pending flight plan, received as inputs captured by the one or more input devices 106, to be displayed on the display unit 104.

Once the pending flight plan or a portion thereof is generated and displayed on the display unit 104, the pilot may want to send a downlink datalink message that includes the pending flight plan or the portion thereof. The flight planning module 102 is configured with datalink integration to enable such a downlink datalink message to be sent directly from the display unit 104 that displays the pending flight plan while the pending flight plan is displayed. In an example, the flight planning module 102 can be configured to implement a first button associated with the display of the pending flight plan, such that the first button, if selected, directs the processing unit(s) executing the flight planning module 102 to cause the pending flight plan to be sent to the ground station in a downlink datalink message (block 308). Moreover, selection of the first button can cause the downlink datalink message including the pending flight plan to be sent without human input to the message applications module 112 corresponding to the class of the downlink datalink message.

In some conventional avionic systems, downlink datalink messages can be initiated from a flight planning module 102. These conventional flight planning modules, however, merely send information to the appropriate message applications module; the downlink datalink message is not sent to the ground station until the pilot selects another button implemented by the message applications module. This other button implemented by the message applications module is typically on a separate display unit from the display unit used by the flight planning module, causing the pilot to have to go back and forth between multiple display units to send the downlink datalink message.

The flight planning module 102 described herein, in contrast, causes the pending flight plan to be sent to the ground station in a downlink datalink message without human input to the message applications module 112. That is, the pilot does not have to select a button implemented by the message applications module 112 in order to send the downlink datalink message.

In an example, in response to selection of the first button implemented by the flight planning module 102, the flight planning module 102 converts the pending flight plan to a format for sending in a datalink message (block 310). Typically, the format for the pending flight plan is standardized based on the class of the datalink message. For example, the pending flight plan can be converted to a format suitable for a controller-pilot datalink communications (CPDLC) message, an ARINC 702 airline operator message, or an ARINC 623 message. Other formats may also be used.

In a first example, the flight planning module 102 causing the pending flight plan to be sent to a ground station includes the flight planning module 102 generating the downlink datalink message including the pending flight plan, for example, including the pending flight plan converted to a suitable format as described above (block 312). Causing the pending flight plan to be sent then includes the flight planning module 102 sending the downlink datalink message generated to the communications routing system 110 such that the communications routing system 110 can route the downlink datalink message over an appropriate datalink to the ground station (block 314). In this first example, no interaction with the message applications module 112 corresponding to the class of the downlink datalink message is used to send the downlink datalink message. Instead, the downlink datalink message is generated and sent by the flight planning module 102 in response to input(s) (e.g., a button selection) received by the flight planning module 102. That is, the flight planning module 102 generates the downlink datalink message with sufficient information that the communications routing system 110 can properly route and transmit the downlink datalink message. Although the above process is described with respect to selection of a single button, other human inputs instead of or in addition to selection of the button can be received by the flight planning module 102 to generate and send the downlink datalink message. For example, the flight planning module 102 can be configured to receive inputs regarding text to be included in the downlink datalink message along with the pending flight plan.

In a second example, the flight planning module 102 causing a pending flight plan to be sent to the ground station includes the flight planning module 102 sending information corresponding to the pending flight plan to the message applications module 112 (block 318) corresponding to the class of the downlink datalink message such that the message applications module 112 can send a downlink datalink message including the pending flight plan to the communications routing system 110 for transmission to a ground station (block 320). In this second example, the message applications module 112 is configured such that the message applications module 112 can send a downlink datalink message based on the information from the flight planning module 102 without human input to the message applications module 112. That is, once the message applications module 112 receives the information from the flight planning module 102, the message applications module 112 automatically sends a downlink datalink message based on the information. In this way, the pilot can send the downlink datalink message through his or her interaction with the flight planning module 102 and the pilot does not have to interact with the message applications module 112.

The flight planning module 102 is configured such that the information sent by the flight planning module is sufficient for the flight planning module 102 to send the downlink datalink message. In a first implementation of this second example, the information sent by the flight planning module 102 is the pending flight plan converted into a format suitable for the downlink datalink message. In such a first implementation, the message applications module 112 generates the downlink datalink message from the pending flight plan received. In such a first implementation, the information sent by the message applications module 112 can also include text to include in the downlink datalink message with the pending flight plan. Such a first implementation may be advantageous since the actual generation of the downlink datalink message is implemented by the message applications module 112 which already includes the capability to generate such a datalink message. In a second implementation, the information sent by the flight planning module 102 comprises a generated downlink datalink message. In such a second implementation, the flight planning module 102 generates the downlink datalink message itself and sends the downlink datalink message to the message applications module 112. The message applications module 112 then forwards the downlink datalink message to the communications routing system 110 for transmission to the ground station. In any implementation of the second example, the message applications module 112 is involved in sending the downlink datalink message to the ground station and can update the message log to account for the downlink datalink message accordingly.

To implement the first button, the flight planning module 102 can be configured to receive signals from the input devices 110 indicating selection of the first button, and in response to selection of the first button, the flight planning module 102 can take the appropriate action(s) as discussed above to cause a downlink datalink message including the pending flight plan to be sent to a ground station. Implementing the first button can include linking selection (e.g., activation) of a physical button (e.g., a physical button 204 as shown in FIG. 2) with the appropriate action(s) to cause a downlink datalink message to be sent. Implementing the first button can also include displaying a button on the screen of the display unit 104 and linking selection of the on-screen button with the appropriate action(s) to cause a downlink datalink message to be sent. Such an on-screen button can be selected, for example, by touching the location of the on-screen button if the screen is a touch screen, or by clicking on the location of the on-screen button if the display unit 104 is associated with a pointing device. As used herein a button is associated with a given image on a display unit, if selection of the button is coordinated with the given image.

In any case, selection of the first button can cause the flight planning module 102 to appropriate action(s) to cause a downlink datalink message to be sent as discussed above. Advantageously, by integrating the functionality of the first button into the display unit 104, the pilot can generate the pending flight plan and send a flight plan modification request to the ground station based on the pending flight plan, all while interacting with the same display unit 104. This eliminates the need for the pilot to access another display unit to generate and send the flight plan modification request by integrating both functions into the same display unit 104. Moreover, the flight planning module 102 can be configured to automatically convert (and incorporate if necessary) the pending flight plan present in the flight planning module 102. Since the information on the pending flight plan was obtained by the flight planning module 102 when generating the pending flight plan, the pilot does not need to re-enter the information in order to include the pending flight plan in the downlink datalink message. Instead, the flight planning module 102 can simply use the previously obtained pending flight plan information and take the appropriate action(s) to cause a downlink datalink message to be sent.

In an example, the downlink datalink message sent to the ground station in response to selection of the first button is a flight plan modification request requesting a flight plan modification from the active flight plan to the pending flight plan. In such an example, the ground station can be the controlling ground station air traffic controller (ATC) for the aircraft, or can be an operator for the airline of the aircraft. In other examples, other downlink datalink messages including the pending flight plan can be generated.

In an example, the flight planning module 102 can also be configured to store the pending flight plan in associated data storage mediums for later retrieval. For example, the pending flight plan can be stored, such that the pending flight plan can be cleared from the display of the display unit 104 and retrieval (i.e., re-displayed) at a later time. In this way, a pilot can store the pending flight plan, return to displaying the active flight plan, and then, at a later time, retrieve (re-display) the pending flight plan. In an example, storing of the pending flight plan can be coordinated with sending of a flight plan modification request. In particular, after sending the flight plan modification request as discussed above, the flight planning module 102 can be configured to automatically (i.e., without further human input) store the flight plan modification request in such a manner that the display of the pending flight plan can be cleared from the display unit 104 and display of the pending flight plan can be re-retrieved at a later time from the stored pending flight plan. The pending flight plan can also be stored in response to an input received from a pilot indicating a desire to store the pending flight plan. For example, the flight planning module 102 can be configured to implement a button associated with a display of the pending flight plan on the display unit 104 such that the button, if selected, directs the flight planning module 102 to store the pending flight plan. In response to selection of the button, the flight planning module 102 can store the pending flight plan.

After storing the pending flight plan, the pending flight plan can be cleared from the screen of the display unit 104 and the active flight plan can be displayed. In an example, the pending flight plan can be cleared automatically (i.e., without further human input) after sending a flight plan modification request. Thus, in response to receiving an input indicating a desire to send a flight plan modification request, the flight planning module 102 can generate and send the flight plan modification request, store the pending flight plan, and clear the pending flight plan from the screen. The active flight plan, or another image, can then be displayed on the screen instead of the pending flight plan. The pending flight plan can also be cleared in response to an input received from a pilot (via the input device(s)) indicating a desire to store the pending flight plan. For example, the flight planning module 102 can be configured to implement a button associated with a display of the pending flight plan on the display unit 104 such that the button, if selected, directs the flight planning module 102 to clear the pending flight plan from the screen of the display unit 104. In response to selection of the button, the flight planning module 102 can clear the pending flight plan from the screen.

Sometime after the pending flight plan has been cleared from the screen of the display unit 104, the flight planning module 102 can be configured to receive signals form the input devices directing the flight planning module 102 to retrieve the pending flight plan from the data storage mediums. For example, the flight planning module 102 can be configured to implement a button associated with the display unit 104 such that the button, if selected, directs the flight planning module 102 to retrieve the pending flight plan. In response to selection of the button, the flight planning module 102 can retrieve the pending flight plan. Retrieval of the pending flight plan includes displaying the pending flight plan on the screen of the display unit 104. This display can take any suitable form as discussed above.

The datalink integration with the flight planning module 102 can also enable certain uplink datalink messages to be displayed by the flight planning module 102 without human input to the message applications module corresponding to those uplink datalink messages. Similar to the downlink datalink messages, this enables the pilot to receive uplink datalink messages at the display unit 104 without requiring that the pilot take the additional step of interacting with the message applications module 102 (which typically requires interacting with a different display unit 104). For example, appropriate uplink datalink messages can be identified by either the communications routing system 110 or the message applications module 112 and the datalink messages or information based on the datalink messages can be sent to the flight planning module 102 automatically, that is, without human input to the message applications module 112.

In a first example of displaying an uplink datalink message by the flight planning module 102 without human input to the message applications module 112, the communications routing system 110 is configured to identify one or more classes of uplink datalink messages and send an uplink datalink message within the one or more classes directly to the flight planning module 102. In conventional systems, all are sent from the communications routing system to a message applications module 112 prior to being sent to the flight planning module 102. In such a conventional system, message applications module 112 then displays information on a display unit such that the pilot (or other human) can receive the information in the uplink datalink message. The pilot is then required to provide a first input to the message applications module 112 before the uplink datalink message is sent to the flight planning module 102. In contrast, in the first example described herein an uplink datalink message of the appropriate one or more classes is not sent to/through a message applications module 112, instead the uplink datalink message is sent directly from the communications routing system 110 to the flight planning module 102. In such a first example, the communications routing system 110 can identify an appropriate message by identifying routing information in the uplink datalink message to identify the class of the uplink datalink message.

In a second example of displaying an uplink datalink message by the flight planning module 102 without human input to the message applications module 112, the message applications module 102 is configured to identify an appropriate uplink datalink message and send information based on the identified uplink datalink message to the flight planning module 102. In this second example, the communications routing system 110 sends all uplink datalink messages to the message applications module 112 as in conventional systems. The message applications module 112, however, is configured to identify appropriate uplink datalink messages and send information based on the appropriate uplink datalink messages to the flight planning module 102 automatically, that is, without human input to the message applications module 112. Since the message applications module 112 does not need human input, the message applications module 112 can send the information to the flight planning module 102 without displaying information corresponding to the message on a display unit. Thus, in some examples, the actions of the message applications module 112 are transparent to the human user (e.g., pilot). The message applications module 112 can identify appropriate messages to send to the flight planning module 102 in any suitable manner. For example, the message applications module 112 can identify messages that include or otherwise correspond to a pending or active flight path, such as flight clearance related messages (lateral, vertical, and/or heading) or ground-initiated flight plan modification requests, and send information based on such messages to the flight planning module 102. In a first implementation of this second example, the information sent by the message applications module 112 is information extracted from the uplink datalink message (such as a pending flight path and associated text). This first implementation may be advantageous in certain circumstances since the message applications module 112 already includes the capability to extract information from datalink messages, this capability is not required in the flight planning module 102. In a second implementation of this second example, the information sent by the message applications module 112 is the uplink datalink message itself. In this implementation, the message applications module 112 can, after identifying the uplink datalink message as an appropriate datalink message for the flight planning module 102, forward the uplink datalink message to the flight planning module 102. In any implementation of the second example, the message applications module 112 is aware of the uplink datalink message and can update the message log appropriately.

In examples where the uplink datalink message includes a pending flight plan or a portion thereof, the flight planning module 102, after receiving the uplink datalink message (or information based thereon) is configured to display the pending flight plan. In some examples, the flight planning module 102 is configured to implement a second button in response to receiving the uplink datalink message (or information based thereon), wherein the second button, if selected, is configured to display the pending flight plan in the uplink datalink message on the display unit 104. In response to selection of the button, the flight planning module 102 can display the pending flight plan on the display unit 104. Since the flight planning module 102 receives the pending flight plan without human input to the message applications module 112, the pending flight plan can be easily displayed by the pilot on the display unit 104 without having to access a separate display unit corresponding to the message applications module 112.

Referring back to the downlink flight plan modification request discussed above, in an example, the uplink datalink message (or information based thereon) received by the flight planning module 102 is a responding clearance to the flight plan modification request. A responding clearance includes a ground requested flight plan (typically based on the pending flight plan sent in the flight plan modification request). In an example, the flight planning module 102 can be configured to display the ground requested flight plan in relation to the pending flight plan previously generated by the pilot. Such functionality enables the pilot to quickly and accurately understand the difference between the ground requested flight plan and the pending flight plan. This comparison between the flight plans enables the pilot to more easily make a determination as to whether to accept the ground requested flight plan. The pending flight plan can be displayed in relation to the ground requested flight plan in any suitable manner. For example, the ground requested flight plan can be overlaid (e.g., in a different color) over the pending flight plan. The ground requested flight plan can also be displayed next to the pending flight plan (e.g., in a separate portion of the screen). The flight planning module 102 can be configured to implement a button associated with the display unit 104, such that the button, if selected, directs the flight planning module 102 to display the ground requested flight plan in relation to the pending flight plan. In response to selection of the button, the flight planning module 102 can display the ground requested flight plan in relation to the pending flight plan as discussed above. The ground requested flight plan and/or pending flight plan can also be displayed in relation to the active flight plan in any of the same manners. In examples where the pending flight plan was stored in the data storage mediums, even if the pending flight plan is no longer displayed on the display unit 104 or actively being used by the pilots, the pending flight plan can be retrieved and displayed in relation to the ground requested flight plan.

In an example, the flight planning module 102 can be configured to implement a button, such that the button, if selected, directs the flight planning module 102 to activate the pending flight plan. Activating the pending flight plan directs the flight management module 108 to implement the pending flight plan as the active flight plan for the aircraft. That is, the flight management module 108 switches from the currently active flight plan to the pending flight plan as the new active flight plan. Accordingly, in response to selection of the button, the flight planning module 102 can active the pending flight plan by sending an activation message to the flight management module 108 including the pending flight plan along with the a command to replace the currently active flight plan with the pending flight plan. In an example the flight planning module 102 can be configured to implement such a button in response to receiving an all clear response to the flight modification request. An all clear response indicates that the flight modification request has been approved by the ground station. Accordingly, such a button enables, provided along with an indication that an all clear response has been received, enables the pilot to activate the pending flight plan sent in a flight modification request without having to re-enter the pending flight plan. In an example, the pending flight plan can be activated with the selection of a single button. Selection of the button can also cause a Will Comply (willco) response downlink datalink message to be sent to the ground station. The pending flight plan can be retrieved from the data storage mediums to enable such activation without having to re-enter the flight plan. A similar button can be implemented to activate a ground requested flight plan.

In an example, the flight planning module 102 can be configured to implement a button, such that the button, if selected, directs the flight planning module 102 to reject the pending flight plan. Rejecting flight plan includes clearing the pending flight plan from the display unit 104 and sending an Unable to Comply response downlink datalink message to be sent to the ground station. In an example, the flight planning module 102 can be configured to implement such a button in response to receiving a ground requested flight plan, as well as in response to other messages from the ground station.

In example, the flight planning module 102 can be configured to implement a button, such that the button, if selected, directs the flight planning module 102 to send a Standby response downlink datalink message to the ground station. Such a button can be implemented in response to receive a ground requested flight plan, as well as in response to other messages from the ground station.

The willco response downlink datalink message, Unable to Comply response downlink datalink message, and Standby downlink datalink message described above can be sent from the flight planning module 102 without human interaction with the message applications module 112 corresponding to the respective message as discussed above.

In an example, the flight planning module 102 can be configured to receive input from the input device(s) to direct the flight planning module 102 to generate a response to a datalink message from a ground station. For example, the input can be a text response to a responding clearance from a ground station. In this way, a pilot can respond to the responding clearance from the display unit 104 and associated input devices(s).

Example Embodiments

Example 1 includes an in-aircraft system comprising: one or more processing units coupled to a display unit; one or more data storage mediums coupled to the one or more processing units, the one or more data storage mediums including instructions which, when executed by the one or more processing units, cause the one or more processing units to implement a flight planning module configured to: display on the display unit a pending flight plan; implement a first button associated with a display of the pending flight plan such that the first button, if selected, directs the one or more processing units to: convert the pending flight plan to a format for sending in a datalink message; and cause the pending flight plan to be sent to a ground station in a downlink datalink message without human input to a message applications module corresponding to a class of the downlink datalink message, the message applications module including instructions to display information corresponding to datalink messages on a display unit and to maintain a message log of datalink messages.

Example 2 includes the in-aircraft system of Example 1, wherein the flight planning module is configured to: generate the downlink datalink message including the pending flight plan; send the downlink datalink message to a ground station by sending the downlink datalink message to a communications routing system which routes the downlink datalink message over an appropriate datalink to the ground station.

Example 3 includes the in-aircraft system of any of Examples 1-2, wherein the flight planning module is configured to send information corresponding to the pending flight plan to the message applications module, wherein the message applications module is configured to send the downlink datalink message including the pending flight plan to a communications routing system which routes the datalink message over the appropriate datalink to the ground station, wherein the downlink datalink message is based on the information received from the flight planning module, wherein the message applications module is also configured to update the message log to account for the downlink datalink message.

Example 4 includes the in-aircraft system of Example 3, wherein the message applications module is configured to generate the downlink datalink message from the information received from the flight planning module.

Example 5 includes the in-aircraft system of any of Examples 1-4, wherein the downlink datalink message is a flight plan modification request requesting a flight plan modification to the pending flight plan.

Example 6 includes the in-aircraft system of Example 5, wherein the flight planning module is configured to: store the pending flight plan in the one or more data storage mediums; after storing the pending flight plan, clear the pending flight plan from the display unit and display an active flight plan instead; after clearing the pending flight plan, receive signals from one or more human input devices directing the one or more processing units to display the pending flight plan stored in the one or more data storage mediums; and display the pending flight plan stored in the one or more data storage mediums.

Example 7 includes the in-aircraft system of Example 6, wherein the flight planning module is configured to: receive an uplink datalink message from the ground station, the datalink message indicating a responding clearance to the flight plan modification request, the responding clearance including a ground requested flight plan; in response to receiving the datalink message, implement a second button associated with a display of the active flight plan such that the second button, if selected, directs the one or more processing units to display the ground requested flight plan; receive signals from the one or more human input devices indicating a selection of the second button; and display the ground requested flight plan in response to selection of the second button.

Example 8 includes the in-aircraft system of Example 7, wherein the flight planning module is configured to: implement a third button associated with a display of the ground requested flight plan such that the third button, if selected, directs the one or more processing units to display the ground requested flight plan in relation to the pending flight plan; receive signals from the one or more human input devices indicating a selection of the third button; and display the ground requested flight plan in relation to the pending flight plan in response to selection of the second button.

Example 9 includes the in-aircraft system of any of Examples 7-8, wherein the flight planning module is configured to: implement a fifth button associated with a display of the ground requested flight plan such that the fifth button, if selected, directs the one or more processing units to clear the ground requested flight plan; receive signals from the one or more human input devices indicating a selection of the fifth button; in response to selection of the fifth button, clear the ground requested flight plan from the display unit and send information corresponding to an Unable to Comply response downlink message to the message applications module, wherein the message applications module is configured to send the Unable to Comply response downlink message to a communications routing system which routes the Unable to Comply response downlink message over the appropriate datalink to the ground station, the message applications module configured to send the Unable to Comply response downlink message to the communications routing system without human input to the message applications module, wherein the message applications module is also configured to update the message log to account for the Unable to Comply response downlink message.

Example 10 includes the in-aircraft system of any of Examples 6-9, wherein the flight planning module is configured to: implement a fifth button associated with a display of the pending flight plan such that the fifth button, if selected, directs the one or more processing units to activate the pending flight plan; receive signals from the one or more human input devices indicating a selection of the fifth button; in response to selection of the fifth button, send an activation message to a flight management module which implements the active flight plan for the aircraft.

Example 11 includes the in-aircraft system of any of Examples 5-10, wherein the flight planning module is configured to: store the pending flight plan without further human input in response to receiving signals from the one or more human input devices directing the one or more processing units to send the pending flight plan to a ground station as a flight plan modification request.

Example 12 includes an in-aircraft system comprising: one or more processing units; one or more data storage mediums coupled to the one or more processing units, the one or more data storage mediums including instructions which, when executed by the one or more processing units, cause the one or more processing units to implement a flight planning module and a message applications module, wherein the message applications module is configured to identify an uplink datalink message corresponding to a pending flight plan, and to send information corresponding to the uplink datalink message to the flight planning module without human input to a message applications module, the message applications module including instructions to display information corresponding to datalink messages on a display unit and to maintain a message log of datalink messages, the message applications module configured to update the message log to account for the uplink datalink message, wherein the flight planning module is configured to display on a display unit a pending flight plan based on the information received from the message applications module.

Example 13 includes the in-aircraft system of Example 12, wherein the uplink datalink message is a ground-initiated flight plan modification request.

Example 14 includes the in-aircraft system of Example 13, wherein the flight planning module is configured to: in response to receiving the information from the message applications module, implement a first button associated with a display of the pending flight plan such that the first button, if selected, directs the one or more processing units to activate the pending flight plan; receive signals from the one or more human input devices indicating a selection of the first button; and in response to selection of the first button: send an activation message to a flight management module which implements the active flight plan for the aircraft, the activation message indicating to activate the pending flight plan; and send information corresponding to a Will Comply response downlink message to the message applications module, wherein the message applications module is configured to send the Will Comply response downlink message to a communications routing system which routes the Will Comply response downlink message over the appropriate datalink to the ground station, the message applications module configured to send the Will Comply response downlink message to the communications routing system without human input to the message applications module, wherein the message applications module is also configured to update the message log to account for the Will Comply response downlink message.

Example 15 includes the in-aircraft system of any of Examples 12-13, wherein the flight planning module is configured to: implement a second button associated with a display of the ground requested flight plan such that the second button, if selected, directs the one or more processing units to clear the ground requested flight plan; receive signals from the one or more human input devices indicating a selection of the second button; in response to selection of the second button, clear the ground requested flight plan from the display unit and send information corresponding to an Unable to Comply response downlink message to the message applications module, wherein the message applications module is configured to send the Unable to Comply response downlink message to a communications routing system which routes the Unable to Comply response downlink message over the appropriate datalink to the ground station, the message applications module configured to send the Unable to Comply response downlink message to the communications routing system without human input to the message applications module, wherein the message applications module is also configured to update the message log to account for the Unable to Comply response downlink message.

Example 16 includes the in-aircraft system of any of Examples 12-15, wherein the uplink datalink message comprises one of a controller-pilot data link communications (CPDLC) message, an ARINC 702 message, or an ARINC 623 message.

Example 17 includes an in-aircraft system comprising: a communications routing system; one or more processing units coupled to a display unit; one or more data storage mediums coupled to the one or more processing units, the one or more data storage mediums including instructions which, when executed by the one or more processing units, cause the one or more processing units to implement a flight planning module, wherein the communications routing system is configured to identify an uplink datalink message directed to the flight planning module, and to send the uplink datalink message to the flight planning module without human input to a message applications module, the message applications module including instructions to display information corresponding to datalink messages on a display unit and to maintain a message log of datalink messages, wherein the flight planning module is configured to: display on a display unit a pending flight plan based on information included in the uplink datalink message.

Example 18 includes the in-aircraft system of Example 17, wherein the uplink datalink message is a ground-initiated flight plan modification request.

Example 19 includes the in-aircraft system of Example 18, wherein the flight planning module is configured to: in response to receiving the uplink datalink message, implement a first button associated with a display of the pending flight plan such that the first button, if selected, directs the one or more processing units to activate the pending flight plan; receive signals from the one or more human input devices indicating a selection of the first button; and in response to selection of the first button: send an activation message to a flight management module which implements the active flight plan for the aircraft, the activation message indicating to activate the pending flight plan; and send information corresponding to a Will Comply response downlink message to the message applications module, wherein the message applications module is configured to send the Will Comply response downlink message to a communications routing system which routes the Will Comply response downlink message over the appropriate datalink to the ground station, the message applications module configured to send the Will Comply response downlink message to the communications routing system without human input to the message applications module, wherein the message applications module is also configured to update the message log to account for the Will Comply response downlink message.

Example 20 includes the in-aircraft system of any of Examples 18-19, wherein the flight planning module is configured to: implement a second button associated with a display of the ground requested flight plan such that the second button, if selected, directs the one or more processing units to clear the ground requested flight plan; receive signals from the one or more human input devices indicating a selection of the second button; in response to selection of the second button, clear the ground requested flight plan from the display unit and send information corresponding to an Unable to Comply response downlink message to the message applications module, wherein the message applications module is configured to send the Unable to Comply response downlink message to a communications routing system which routes the Unable to Comply response downlink message over the appropriate datalink to the ground station, the message applications module configured to send the Unable to Comply response downlink message to the communications routing system without human input to the message applications module, wherein the message applications module is also configured to update the message log to account for the Unable to Comply response downlink message.

What is claimed is:

1. An in-aircraft system comprising:

one or more processing units coupled to a display unit;

one or more data storage mediums coupled to the one or more processing units, the one or more data storage mediums including instructions which, when executed by the one or more processing units, cause the one or more processing units to implement a flight planning module configured to:

display on the display unit a pending flight plan;

implement a first button associated with a display of the pending flight plan such that the first button, if selected, directs the one or more processing units to:

convert the pending flight plan to a format for sending in a datalink message; and cause the pending flight plan to be sent to a ground station in a downlink datalink message without human input to a message applications module corresponding to a class of the downlink datalink message, the message applications module including instructions to display information corresponding to datalink messages on a display unit and to maintain a message log of datalink messages.

2. The in-aircraft system of claim 1, wherein the flight planning module is configured to send information corresponding to the pending flight plan to the message applications module, wherein the message applications module is configured to send the downlink datalink message including the pending flight plan to a communications routing system which routes the datalink message over the appropriate datalink to the ground station, wherein the downlink datalink message is based on the information received from the flight planning module, wherein the message applications module is also configured to update the message log to account for the downlink datalink message.

3. The in-aircraft system of claim 2, wherein the message applications module is configured to generate the downlink datalink message from the information received from the flight planning module.

4. The in-aircraft system of claim 1, wherein the downlink datalink message is a flight plan modification request requesting a flight plan modification to the pending flight plan.

5. The in-aircraft system of claim 4, wherein the flight planning module is configured to:

store the pending flight plan in the one or more data storage mediums;

after storing the pending flight plan, clear the pending flight plan from the display unit and display an active flight plan instead;

after clearing the pending flight plan, receive signals from one or more human input devices directing the one or more processing units to display the pending flight plan stored in the one or more data storage mediums; and display the pending flight plan stored in the one or more data storage mediums.

6. The in-aircraft system of claim 5, wherein the flight planning module is configured to:

receive an uplink datalink message from the ground station, the datalink message indicating a responding clearance to the flight plan modification request, the responding clearance including a ground requested flight plan;

in response to receiving the datalink message, implement a second button associated with a display of the active flight plan such that the second button, if selected, directs the one or more processing units to display the ground requested flight plan;

receive signals from the one or more human input devices indicating a selection of the second button; and display the ground requested flight plan in response to selection of the second button.

7. The in-aircraft system of claim 6, wherein the flight planning module is configured to:

implement a third button associated with a display of the ground requested flight plan such that the third button, if selected, directs the one or more processing units to display the ground requested flight plan in relation to the pending flight plan;

receive signals from the one or more human input devices indicating a selection of the third button; and display the ground requested flight plan in relation to the pending flight plan in response to selection of the second button.

8. The in-aircraft system of claim 6, wherein the flight planning module is configured to:

implement a fourth button associated with a display of the ground requested flight plan such that the fourth button, if selected, directs the one or more processing units to activate the ground requested flight plan;

receive signals from the one or more human input devices indicating a selection of the fourth button;

in response to selection of the fourth button, send an activation message to a flight management module which implements the active flight plan for the aircraft and send information corresponding to a Will Comply response downlink message to the message applications module, wherein the message applications module is configured to send the Will Comply response downlink message to a communications routing system which routes the Will Comply response downlink message over the appropriate datalink to the ground station, the message applications module configured to send the Will Comply response downlink message to the communications routing system without human input to the message applications module, wherein the message applications module is also configured to update the message log to account for the Will Comply response downlink message.

9. The in-aircraft system of claim 6, wherein the flight planning module is configured to:

implement a fifth button associated with a display of the ground requested flight plan such that the fifth button, if selected, directs the one or more processing units to clear the ground requested flight plan;

receive signals from the one or more human input devices indicating a selection of the fifth button;

in response to selection of the fifth button, clear the ground requested flight plan from the display unit and send information corresponding to an Unable to Comply response downlink message to the message applications module, wherein the message applications module is configured to send the Unable to Comply response downlink message to a communications routing system which routes the Unable to Comply response downlink message over the appropriate datalink to the ground station, the message applications module configured to send the Unable to Comply response downlink message to the communications routing system without human input to the message applications module, wherein the message applications module is also configured to update the message log to account for the Unable to Comply response downlink message.

10. The in-aircraft system of claim 4, wherein the flight planning module is configured to:

store the pending flight plan without further human input in response to receiving signals from the one or more human input devices directing the one or more processing units to send the pending flight plan to a ground station as a flight plan modification request.

11. The in-aircraft system of claim 1, wherein the flight planning module is configured to:

generate the downlink datalink message including the pending flight plan;

send the downlink datalink message to a ground station by sending the downlink datalink message to a communications routing system which routes the downlink datalink message over an appropriate datalink to the ground station.

12. An in-aircraft system comprising:

one or more processing units;

one or more data storage mediums coupled to the one or more processing units, the one or more data storage mediums including instructions which, when executed by the one or more processing units, cause the one or more processing units to implement a flight planning module and a message applications module, wherein the message applications module is configured to identify an uplink datalink message corresponding to a pending flight plan, and to send information corresponding to the uplink datalink message to the flight planning module without human input to a message applications module, the message applications module including instructions to display information corresponding to datalink messages on a display unit and to maintain a message log of datalink messages, the message applications module configured to update the message log to account for the uplink datalink message, wherein the flight planning module is configured to display on a display unit a pending flight plan based on the information received from the message applications module.

13. The in-aircraft system of claim 12, wherein the uplink datalink message is a ground-initiated flight plan modification request.

14. The in-aircraft system of claim 13, wherein the flight planning module is configured to:

in response to receiving the information from the message applications module, implement a first button associated with a display of the pending flight plan such that the first button, if selected, directs the one or more processing units to activate the pending flight plan;

receive signals from the one or more human input devices indicating a selection of the first button; and in response to selection of the first button:

send an activation message to a flight management module which implements the active flight plan for the aircraft, the activation message indicating to activate the pending flight plan; and send information corresponding to a Will Comply response downlink message to the message applications module, wherein the message applications module is configured to send the Will Comply response downlink message to a communications routing system which routes the Will Comply response downlink message over the appropriate datalink to the ground station, the message applications module configured to send the Will Comply response downlink message to the communications routing system without human input to the message applications module, wherein the message applications module is also configured to update the message log to account for the Will Comply response downlink message.

15. The in-aircraft system of claim 13, wherein the flight planning module is configured to:

implement a second button associated with a display of the ground requested flight plan such that the second button, if selected, directs the one or more processing units to clear the ground requested flight plan;

receive signals from the one or more human input devices indicating a selection of the second button;

in response to selection of the second button, clear the ground requested flight plan from the display unit and send information corresponding to an Unable to Comply response downlink message to the message applications module, wherein the message applications module is configured to send the Unable to Comply response downlink message to a communications routing system which routes the Unable to Comply response downlink message over the appropriate datalink to the ground station, the message applications module configured to send the Unable to Comply response downlink message to the communications routing system without human input to the message applications module, wherein the message applications module is also configured to update the message log to account for the Unable to Comply response downlink message.

16. The in-aircraft system of claim 12, wherein the uplink datalink message comprises one of a controller-pilot data link communications (CPDLC) message, an ARINC 702 message, or an ARINC 623 message.

17. An in-aircraft system comprising:

a communications routing system;

one or more processing units coupled to a display unit;

one or more data storage mediums coupled to the one or more processing units, the one or more data storage mediums including instructions which, when executed by the one or more processing units, cause the one or more processing units to implement a flight planning module, wherein the communications routing system is configured to identify an uplink datalink message directed to the flight planning module, and to send the uplink datalink message to the flight planning module without human input to a message applications module, the message applications module including instructions to display information corresponding to datalink messages on a display unit and to maintain a message log of datalink messages, wherein the flight planning module is configured to:

display on a display unit a pending flight plan based on information included in the uplink datalink message.

18. The in-aircraft system of claim 17, wherein the uplink datalink message is a ground-initiated flight plan modification request.

19. The in-aircraft system of claim 18, wherein the flight planning module is configured to:

in response to receiving the uplink datalink message, implement a first button associated with a display of the pending flight plan such that the first button, if selected, directs the one or more processing units to activate the pending flight plan;

receive signals from the one or more human input devices indicating a selection of the first button; and in response to selection of the first button:

send an activation message to a flight management module which implements the active flight plan for the aircraft, the activation message indicating to activate the pending flight plan; and send information corresponding to a Will Comply response downlink message to the message applications module, wherein the message applications module is configured to send the Will Comply response downlink message to a communications routing system which routes the Will Comply response downlink message over the appropriate datalink to the ground station, the message applications module configured to send the Will Comply response downlink message to the communications routing system without human input to the message applications module, wherein the message applications module is also configured to update the message log to account for the Will Comply response downlink message.

20. The in-aircraft system of claim 18, wherein the flight planning module is configured to:

implement a second button associated with a display of the ground requested flight plan such that the second button, if selected, directs the one or more processing units to clear the ground requested flight plan;

receive signals from the one or more human input devices indicating a selection of the second button;

in response to selection of the second button, clear the ground requested flight plan from the display unit and send information corresponding to an Unable to Comply response downlink message to the message applications module, wherein the message applications module is configured to send the Unable to Comply response downlink message to a communications routing system which routes the Unable to Comply response downlink message over the appropriate datalink to the ground station, the message applications module configured to send the Unable to Comply response downlink message to the communications routing system without human input to the message applications module, wherein the message applications module is also configured to update the message log to account for the Unable to Comply response downlink message.

* * * * *